(12) United States Patent
Rampal

(10) Patent No.: US 11,138,464 B2
(45) Date of Patent: Oct. 5, 2021

(54) IMAGE PROCESSING DEVICE, IMAGE PROCESSING METHOD, AND IMAGE PROCESSING PROGRAM

(71) Applicant: NEC Corporation, Tokyo (JP)

(72) Inventor: Karan Rampal, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/464,711

(22) PCT Filed: Nov. 30, 2016

(86) PCT No.: PCT/JP2016/085537
§ 371 (c)(1),
(2) Date: May 29, 2019

(87) PCT Pub. No.: WO2018/100668
PCT Pub. Date: Jun. 7, 2018

(65) Prior Publication Data
US 2019/0311216 A1    Oct. 10, 2019

(51) Int. Cl.
*G06K 9/62* (2006.01)
*G06K 9/42* (2006.01)
*G06K 9/46* (2006.01)

(52) U.S. Cl.
CPC ............ *G06K 9/623* (2013.01); *G06K 9/42* (2013.01); *G06K 9/4671* (2013.01); *G06K 9/6211* (2013.01); *G06K 9/6215* (2013.01); *G06K 9/6228* (2013.01); *G06K 9/6256* (2013.01)

(58) Field of Classification Search
CPC ...... G06K 9/42; G06K 9/4671; G06K 9/6228; G06K 9/6256; G06K 9/6211; G06K 9/6215; G06K 9/623
See application file for complete search history.

(56) References Cited

U.S. PATENT DOCUMENTS

| | | | |
|---|---|---|---|
| 9,501,714 B2 | 11/2016 | Qi | |
| 9,514,536 B2* | 12/2016 | Rafati | G06K 9/00275 |
| 9,805,282 B2* | 10/2017 | Mase | G06K 9/4671 |
| 9,824,294 B2* | 11/2017 | Ruan | G06K 9/4676 |

(Continued)

FOREIGN PATENT DOCUMENTS

| | | |
|---|---|---|
| JP | 2008-093172 A | 4/2008 |
| JP | 2011-253354 A | 12/2011 |

(Continued)

OTHER PUBLICATIONS

International Search Report in International Application No. PCT/JP2016/085537, dated Mar. 7, 2017.

(Continued)

*Primary Examiner* — Gregory M Desire
(74) *Attorney, Agent, or Firm* — Sughrue Mion, PLLC

(57) ABSTRACT

An image processing device 10 includes: a feature extraction unit 11 which obtains features in each of scaled samples of the region of interest in a probe image; a saliency generation unit 12 which computes the probabilities of the pixels in the scaled samples that contribute to the score or the label of the object of interest in the region; a dropout processing unit 13 which removes the features from the scaled samples which are not essential for the computing the score or the label of the object, using the computed probabilities.

18 Claims, 7 Drawing Sheets

(56) References Cited

U.S. PATENT DOCUMENTS

| | | | |
|---|---|---|---|
| 9,830,529 B2* | 11/2017 | Jetley | G06N 3/0454 |
| 9,881,234 B2* | 1/2018 | Huang | G06K 9/6232 |
| 9,953,423 B2* | 4/2018 | Miyasa | G06K 9/4604 |
| 2004/0240733 A1* | 12/2004 | Hobson | G06T 7/44 |
| | | | 382/170 |
| 2005/0078881 A1* | 4/2005 | Xu | G06T 7/337 |
| | | | 382/294 |
| 2007/0211938 A1 | 9/2007 | Tu et al. | |
| 2009/0202114 A1* | 8/2009 | Morin | A63F 13/213 |
| | | | 382/118 |
| 2009/0202124 A1 | 8/2009 | Matsuda et al. | |
| 2012/0301015 A1 | 11/2012 | Tanase et al. | |
| 2013/0343642 A1 | 12/2013 | Kuo et al. | |
| 2014/0098221 A1 | 4/2014 | Brown et al. | |
| 2014/0205206 A1 | 7/2014 | Datar et al. | |
| 2018/0089596 A1* | 3/2018 | Hirose | G06Q 10/02 |
| 2018/0218495 A1* | 8/2018 | Ben-Ari | G06K 9/3233 |
| 2019/0311216 A1* | 10/2019 | Rampal | G06K 9/42 |

FOREIGN PATENT DOCUMENTS

| | | |
|---|---|---|
| JP | 2012-243197 A | 12/2012 |
| JP | 2013-541119 A | 11/2013 |
| JP | 2016-506000 A | 2/2016 |

OTHER PUBLICATIONS

Written Opinion in International Application No. PCT/JP2016/085537, dated Mar. 7, 2017.

Shengcai Liao, et al., "Person re-identification by Local Maximal Occurrence representation and metric learning", 2015 IEEE Computer Vision Foundation (CVF), pp. 2197-2206 (10 pages total).

Sumit Chopra, et al., "Learning a Similarity Metric Discriminatively, with Application to Face Verification", Courant Institute of Mathematical Sciences, New York, NY (8 pages total).

Japanese Office Action for JP Application No. 2019-527275 dated Jul. 28, 2020 with English Translation.

* cited by examiner

IMAGE PROCESSING DEVICE, IMAGE PROCESSING METHOD, AND IMAGE PROCESSING PROGRAM

This application is a National Stage Entry of PCT/JP2016/085537 filed on Nov. 30, 2016, the contents of all of which are incorporated herein by reference, in their entirety.

TECHNICAL FIELD

The present invention relates to an image processing device, an image processing method, and an image processing program, and more particularly to an image processing device, an image processing method, and an image processing program to remove background for object recognition purpose.

BACKGROUND ART

Object recognition tasks have many practical uses such as in surveillance, biometrics etc. The goal of these tasks is to output a label or a score indicating the level of similarity between a pair of input images containing the object of interest. The object here can be person, vehicle, animal etc. Metric learning is one of the most effective techniques to get the similarity scores. The objective of this technique is to compute distance between the inputs by first projecting them into a feature space, which itself can be learnt or hand-crafted. Next, a metric or a function is learnt which can compute distance in the new feature space by effectively separating similar features and dissimilar features by a given margin.

However, for robust object recognition we need to consider the effect of the background on the final score as well. This is because in unconstrained environments the background can cause false positive results or false negative results. For example, in cases the objects are very different, the recognition algorithm can still result in high similarity score only because the backgrounds are quite similar. The reverse is also true, for similar objects but dissimilar backgrounds, the recognition score can be quite low. Hence there is a need to tackle this problem.

There has not been much progress to tackle this problem and it is still an open problem to solve. Many methods focus on improving the detection methods so that the resulting image contains more of the object than the background. While other methods concentrate on improving features or metrics. There has not been much systematic effort in background subtraction itself. Hence there is a need for methods which can address the effect of background in recognition tasks.

One of the methods for object recognition is by combining multiple metrics, see PTL 1. In PTL 1, multiple handcrafted features are extracted from the images and then a number of similarity function such as Bhattacharya coefficient, cosine similarity etc. are used. Finally to combine them a RankBoost algorithm is used. This gives high accuracy and combines the advantages of many metrics together.

Another method for scale estimation is using triangulated graphs, see PTL 2. In PTL 2, triangulated graphs are fitted inside the object (person, for example) by minimizing an energy function using dynamic programming. This describes the shape of the person. This method also combines color information by using HSV color space to increase robustness of the method.

In PTL 3, brightness transfer function (BTF) are found. These are functions which map appearance of objects from one camera to another camera. These BTF maps found from each training image is weighted-combined into a single model (WBTF) and used for prediction. It is good for cases where illumination variation is a major concern.

In NPL 1, handcrafted features called by Local Maximal Occurrence representation (LOMO) are computed for each image. In this method a projection matrix is learnt to efficiently along with a metric function which is similar in principal to the quadratic discriminant analysis technique.

The method in NPL 2 discloses the similarity between a pair of images in an end to end manner. This means that the entire pipeline of feature generation, extraction and metric learning is lumped together by learning a deep neural network. Also a contrastive loss function is proposed which helps improving on the discrimination ability.

CITATION LIST

Patent Literature

[PTL 1]
United States Patent Application Publication No. 2007/0211938
[PTL 2]
United States Patent Application Publication No. 2013/0343642
[PTL 3]
United States Patent Application Publication No. 2014/0098221
[PTL 4]
Japanese Patent Application Laid-Open No. 2011-253354
[PTL 5]
Japanese Translation of PCT International Application Publication No. 2013-541119

Non Patent Literature

[NPL 1]
S. Liao, Y. Hu, Xiangyu Zhu, and S. Z. Li, "Person re-identification by Local Maximal Occurrence representation and metric learning," 2015 IEEE Conference on Computer Vision and Pattern Recognition (CVPR), Boston, Mass., 2015, pp. 2197-2206.
[NPL 2]
S. Chopra, R. Hadsell, and Y. LeCun, "Learning a Similarity Metric Discriminatively, with Application to Face Verification," 2005 IEEE Conference on Computer Vision and Pattern Recognition (CVPR), Washington, D C, 2005, 539-546.

SUMMARY OF INVENTION

Technical Problem

Object recognition involves extracting features from the input images for the purpose of representing the object in a more descriptive space. In this space, or its subspace a metric function or a distance function is learnt. This function can be used to compare the input images. However, after feature extraction we also have features which belong to the background and not just the input image. These background features can cause mismatches in the recognition result. The metric that is learnt from these features is not robust enough, hence we need a technique that can remove such features early on in the learning process.

In PTL 1, multiple metrics are learnt or computed from the input features. These are then combined using a ranking function which weighs each of the metrics. This ranking function is learnt in a similar manner to that of boosting algorithms. In this technique the background feature problem is not addressed directly. It is assumed in PTL 1 that at least one of the metric functions will be discriminative enough to learn the difference between foreground features and background features. However, this is dependent on application, features etc. and not handled directly.

The method disclosed in PTL 2 models the object shape using triangulated graphs and the color histogram. This results in better performance for foreground and background discrimination. However, for non-rigid objects it is hard to model the shape effectively. For example when the object is human the shape is arbitrary and not geometric like square, ellipse etc. Hence, this method does not apply to such cases well.

In PTL 3, functions which map appearance of objects from one camera to another camera are learnt. This is not always feasible as we may not have access or control of the environment. Without the calibration information it is difficult to learn the projection matrix and hence the mapping functions.

The method disclosed in NPL 1 requires handcrafted features. These are features which are designed specifically for a particular application in mind. Such features perform very well for a certain application, however, they are not generalized well to other application areas.

The device disclosed in PTL 4 removes the unnecessary features by using depth information. It needs hardware or camera calibration information to find depth information in the image.

The method disclosed in PTL 5 uses dispersion of pixels to remove unnecessary (background) features. If dispersion of pixels is high it is considered as background and removed else that it is foreground. This method is not suitable for scenes with illumination variation since it assumes that low dispersion pixels are necessarily foreground.

One of the objects of the present invention is to provide an image processing device, an image processing method, and an image processing program that is capable of reducing the effect of the background on the similarity score or the similarity label of the object recognition task.

Solution to Problem

An image processing device according to the present invention includes: feature extraction means which obtains features in each of scaled samples of the region of interest in a probe image; saliency generation means which computes the probabilities of the pixels in the scaled samples that contribute to the score or the label of the object of interest in the region; and dropout processing means which removes the features from the scaled samples which are not essential for the computing the score or the label of the object, using the computed probabilities.

An image processing method according to the present invention includes the steps of: obtaining features in each of scaled samples of the region of interest in a probe image; computing the probabilities of the pixels in the scaled samples that contribute to the score or the label of the object of interest in the region; and removing the features from the scaled samples which are not essential for the computing the score or the label of the object, using the computed probabilities.

A non-transitory computer-readable recording medium having recorded therein an image processing program according to the present invention that, when executed by a computer, obtains features in each of scaled samples of the region of interest in a probe image, computes the probabilities of the pixels in the scaled samples that contribute to the score or the label of the object of interest in the region, and removes the features from the scaled samples which are not essential for the computing the score or the label of the object, using the computed probabilities.

Advantageous Effects of Invention

According to the present invention, it is able to reduce the effect of the background on the similarity score or the similarity label of the object recognition task.

DESCRIPTION OF EMBODIMENTS

The overall approach to solve the technical problems discussed above, is summarized here. The object recognition performance is affected by the background features especially in case of complex background scenes and hence need to be restrained. Given the location of the object of interest in the image, a number of scaled samples are generated. From these scaled samples features are extracted. Using the object detector a saliency map is generated by taking the backpropagation of the detector output with respect to the input images. With the help of the saliency map probabilities of the pixels which belong to object or background is computed. Using this dropout is performed by removing neurons belonging to the features whose pixel probability is background. Next, using feature matching on the remaining features a score can be obtained and the one target image with the highest score can be selected as the output.

The current invention has been designed to solve these above mentioned problems. In addition to the above described entities, other evident and obvious disadvantages that this invention can overcome will be clearly revealed from the detailed specification and drawings.

First Exemplary Embodiment

Hereinafter, a first exemplary embodiment of the present invention will be described in detail.

Figure 1:
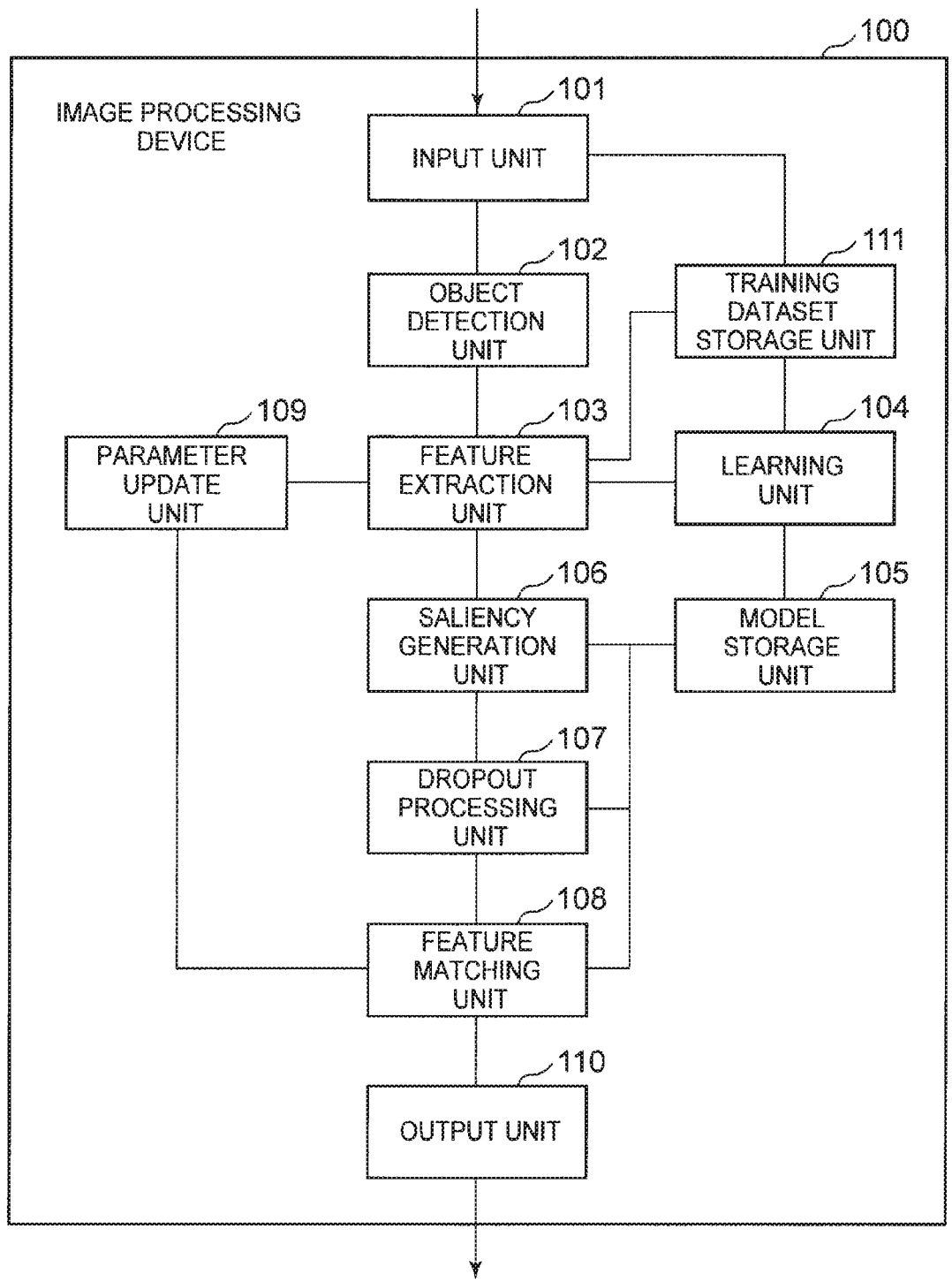
FIG. 1 is a block diagram showing an example of a structure of an image processing device 100 according to a first exemplary embodiment of the present invention.

FIG. 1 is a block diagram showing an example of a structure of an image processing device 100 according to the first exemplary embodiment of the present invention. With reference to FIG. 1, the image processing device 100 includes an input unit 101, an object detection unit 102, a feature extraction unit 103, a learning unit 104, a model storage unit 105, a saliency generation unit 106, a dropout processing unit 107, a feature matching unit 108, a parameter update unit 109, an output unit 110 and a training dataset storage unit 111.

The input unit 101 receives a series of frames i.e. images, for example, frames of a video, still images or the like, in tracking phase. The input unit 101 may receive a series of frames i.e. training frames, for example, in learning phase or before the learning phase. In the following description, the frames and a frame in the frames may be referred to as "images" and an "image" respectively. The training frames and a training frame in the training frames are referred to as "training images" and a "training image" respectively.

The object detection unit 102 detects a region of interest i.e. an object, such as a face or one of other objects which may include several parts, in the frames. In the following explanation, the object detection unit 102 detects a person in the frame. It provides the location of the person in the frame, i.e. the x and y co-ordinates of the upper-left and lower-right bounding box. In the following description, the object detection unit 102 may be referred to as "the object detector".

The feature extraction unit 103 is used to extract the features from the region of interest that are provided to it by the object detection unit 102. Using the location provided by the object detection unit 102, the feature extraction unit 103 generates scaled samples. These samples are then normalized to lie in the same co-ordinate system. The coordinates are defined in a coordinate system set in advance in the frames. Finally, the features are extracted from these sample images. These features can be a combination of edge, texture, color, temporal, spatial and/or other higher level information or lower level information from the sample images.

The learning unit 104 learns the model by one or more series of training frames. More specifically, the learning unit 104 learns the model which will be used for computing the saliency map of the samples, by features extracted from training frames. The learning unit 104 may compute the mean vector and the covariance matrix from the features of the samples as part of the parameter learning for the model. It may also compute the gradient of the object detector output with respect to the input image.

The model essentially captures the distribution of the features of the scaled samples. More specifically it captures the likelihood of an image pixel to belong to a particular label, which has been outputted by the object detector. The object detector maximizes its output score such that the given input image matches the desired label, in our case the opposite is needed, given a label we need to generate an image that matches the label. The model storage unit 105 is used to store the model's parameters which are used for inference purpose and to evaluate the model on a given input.

The saliency generation unit 106 derives the probability of a pixel to belong to a particular label using the model parameters stored in the model storage unit 105. The probability is computed by obtaining the gradient of the output from the object detector with respect to a random image. This random image is then iteratively updated till finally the pixels in this image depict the probability. This procedure produces the required saliency map iteratively.

The saliency map produced in the saliency generation unit 106 is the input of the dropout processing unit 107. In the dropout processing unit 107 each of the features of the samples are directly associated with their probability from the saliency map. If the probability of the feature is low, that is it belongs to the background class, then it is removed or dropped out. If the feature belongs to the object then the feature is rescaled using the probability. This produces the final features which will be used for matching.

The feature matching unit 108 selects the sample with the highest score by comparing the features of the target image and the features of the probe image. The features of the probe image at this scale are matched with the features of the enrolled target images. For each of the target images a score is generated by the feature matching unit 108. The model parameters are updated by the parameter update unit 109.

In the following description, a set of the feature extraction unit 103, the saliency generation unit 106, the dropout processing unit 107, and the feature matching unit 108 may be referred to as "the estimation processing unit".

The output unit 110 outputs the final target image or the ID. The output unit 110 may plot predetermined marks representing the ID on the frame at some predetermined positions represented by the x, y coordinates and the scale (width, height) of the object bounding box in the output which is the frame with the plotted marks.

The training dataset storage unit 111 stores one or more series of training samples which contain target image and probe image pairs and a label indicating whether they are the same object or not. The input unit 101 may not be used to achieve the training dataset storage unit 111.

Next, an operation of the image processing device 100 according to the first exemplary embodiment will be explained in detail with reference to figures.

Figure 2:
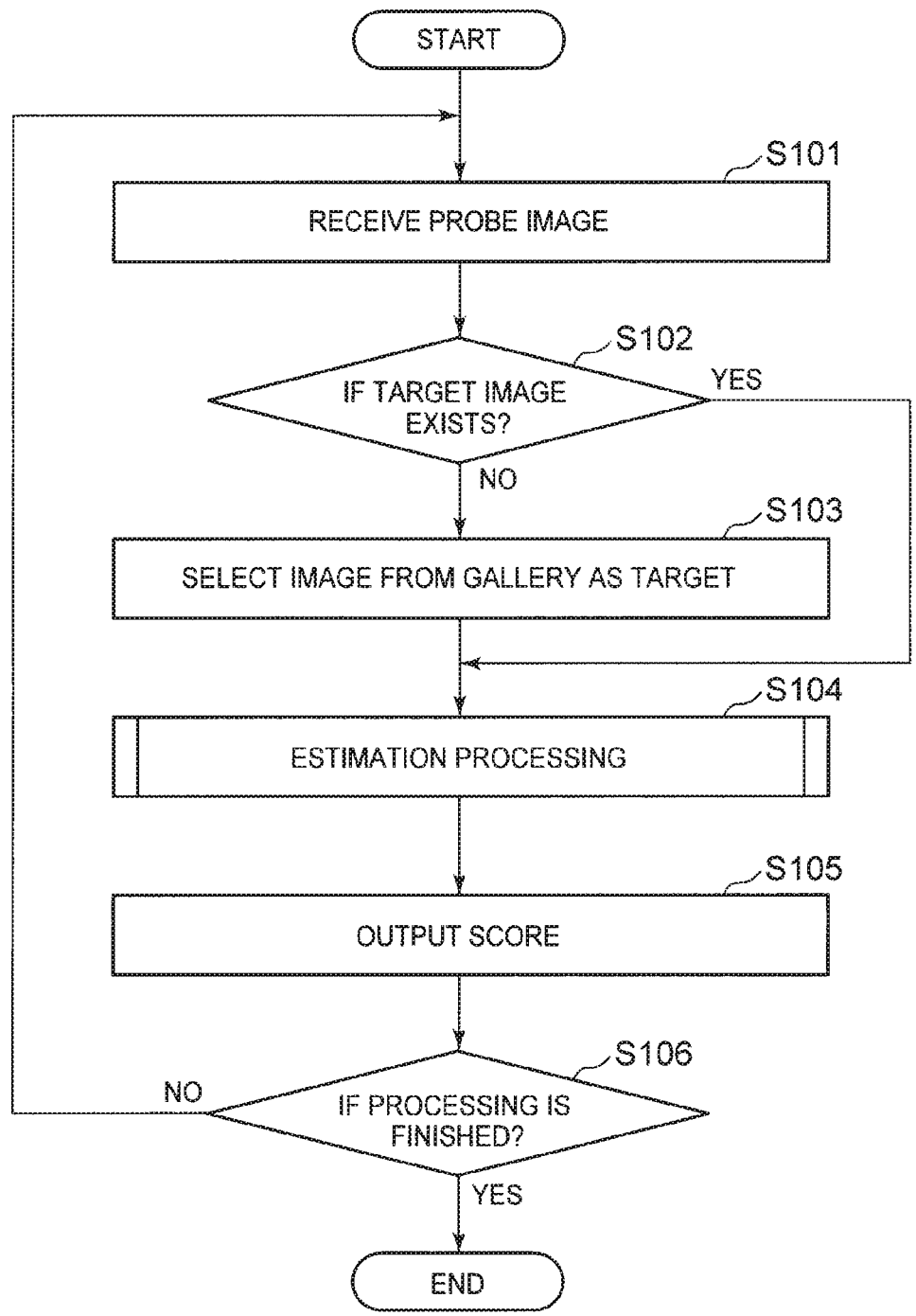
FIG. 2 is a flowchart showing an example of an operation of the image processing device 100 according to the first exemplary embodiment of the present invention.

FIG. 2 is a flowchart showing an example of the operation of the image processing device 100 according to the first exemplary embodiment of the present invention.

The operation of the image processing device 100 according to the first exemplary embodiment of the present invention can be broadly divided into training phase and evaluation phase. In this paragraph an overview of the invention will be described with reference to FIG. 2 and the evaluation phase will be explained. The recognition of the object begins by detection of object in an image or a frame. As can be seen in FIG. 2, the input to the system (Step S101) is an image of the object called the probe image. The object detection unit 102 performs a check to find out if there exists a target image (Step S102). The target image is also called the enrolled images in a gallery. If no target image has been selected (NO in Step S102), then an image from the gallery is selected (Step S103) which has been enrolled previously. The object detection unit 102 may be a specific implementation of a general object detector. The detected object and the selected target image are now provided to the estimation processing unit (Step S104). When a target image exists (YES in Step S102), then it is directly given to Step S104. After that the output score is generated (Step S105) by the estimation processing unit. Finally if all the target images have been compared then the processing is finished.

The estimation processing will be explained in detail later along with the drawings in FIG. 3. The following is a brief description of the estimation processing unit. This unit scores each of the samples generated from the current frame and the target image and output is the one which has the maximum score.

Next, the output unit 110 outputs the estimated ID or the estimated label and score i.e. the final output described above (Step S105). When processing of the image processing device 100 is not finished (No in Step S106), the input unit 101 receives a next frame (Step S101). When processing of the image processing device 100 is finished by an instruction from a user of the image processing device 100 via a input device (not illustrated) (YES in Step S106) or if all the target images have been processed, the image processing device 100 stops the processing shown in FIG. 2.

Next, an operation of the image processing device 100 according to the first exemplary embodiment in the estimation processing phase will be described in detail with reference to drawings.

Figure 3:
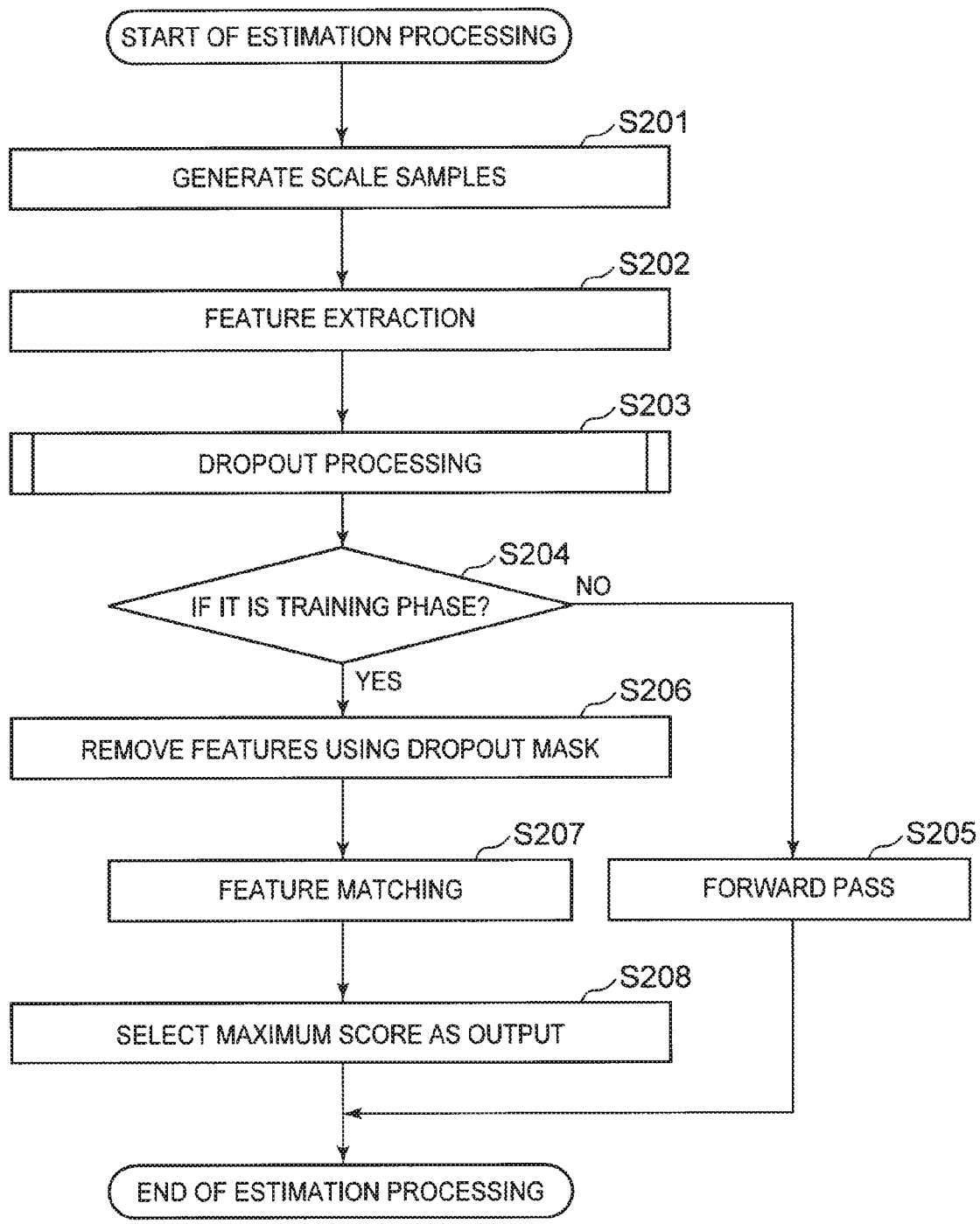
FIG. 3 is a flowchart showing the estimation process of the image processing device 100 according to the first exemplary embodiment of the present invention.

FIG. 3 is a flowchart showing an example of an operation of the image processing device 100 according to the first exemplary embodiment in the estimation processing phase.

As described above, the models for estimation processing are needed to be learnt. So, given the target image and the samples which are the scaled probe image or the scaled query image are generated by the Step S201. These samples are extracted around the region given by the object location and the scale provided by the object detector. Next, the features are extracted from theses samples (Step S202). Extracted features refer to features such as HOG (Histogram of Oriented Gradients), LBP (Local Binary Patterns), normalized gradients, color histograms etc. In Step S203 we perform the dropout processing. This will be explained in detail later using the FIG. 4. Next, if we are in the training phase (YES in Step S204) it means we need to remove the features of the background using the mask from Step S203 (Step S206). The mask is the output of the dropout processing in Step S203. This is done using elementwise multiplication of the mask with the feature map generated in the feature extraction (Step S202). Using reduced features from the feature map we get the score using the feature matching (Step S207). Finally, we can select the maximum score from all the scales as the final output (Step S208). In case of NO in Step S204, there is no need for the masking operation, all we need to do is perform the forward pass (the classifier forward pass) that is send the data as it is undisturbed (Step S205). This procedure is explained in more detail below:

[Math. 1]

$$\bar{x} = \frac{1}{N}\sum_{i=1}^{N} x_i \qquad \text{Equation (1)}$$

In the Equation (1), a left member is the mean or the average of the samples. It is one of the parameters that is used for normalizing the features before the actual dropout procedure. The '$x_i$' is the vector of features of the $i^{th}$ sample and 'N' is the total number of scaled samples.

[Math. 2]

$$V = \frac{1}{N}\sum_{i=1}^{N}(x_i - \bar{x})^2 \qquad \text{Equation (2)}$$

In the Equation (2), 'V' is the variance of the feature vectors. Using these two equations we can normalize the features to have zero mean and unit variance. The normalization is done by using the following equation:

[Math. 3]

$$x_i = \frac{(x_i - \bar{x})}{V} \qquad \text{Equation (3)}$$

After the features have been normalized they are passed to the dropout processing (Step S203). This procedure will be explained in more detail here using FIG. 4 as reference.

Figure 4:
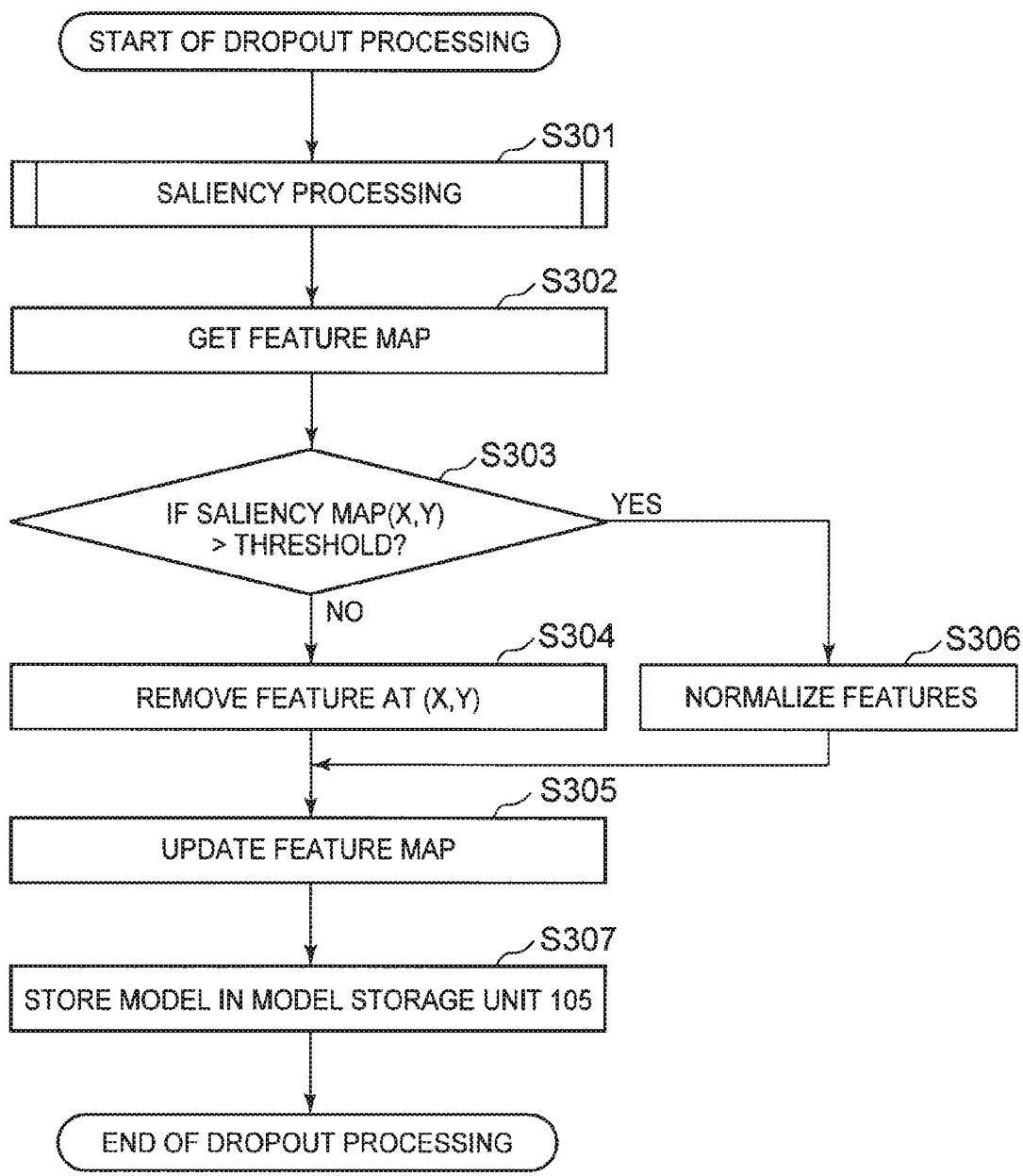
FIG. 4 is a flowchart showing the dropout process of the image processing device 100 according to the first exemplary embodiment of the present invention.

FIG. 4 is a flowchart of the dropout processing step of the image processing device 100 according the first exemplary embodiment of the present invention. The first step in dropout processing is saliency processing (Step S301). This is used to produce a saliency map and will be explained in detail later with the help of FIG. 5. The saliency map is used to get the pixel probabilities. Next, in Step S302 we get the feature map. It is just the features which were extracted in Step S202, but resized to form a 3 dimensional map. Next, in Step S303 the entries of the saliency map are checked at each pixel location, i.e. x and y axis, against a threshold. This threshold is selected beforehand. If the probability in the saliency map is greater than the threshold 'T' (YES in Step S303) then the corresponding features are just renormalized (Step S306) using the Equation (4) below:

[Math. 4]

$$x_i = \frac{x_i}{T} \qquad \text{Equation (4)}$$

If the probability is not greater than the threshold 'T' (NO in Step S303), then the corresponding feature is removed by setting it to zero in Step S304. Next, the feature map is updated by reshaping the map again back to its original dimensions instead of the 3 dimensions as in Step S302 (Step S305).

Next, the saliency map generated in Step S301 is stored in the model storage unit 105 according to the Step S307. After the image processing device 100 stops the dropout processing shown in FIG. 4. Next, the saliency processing step will be explained using FIG. 5.

Figure 5:
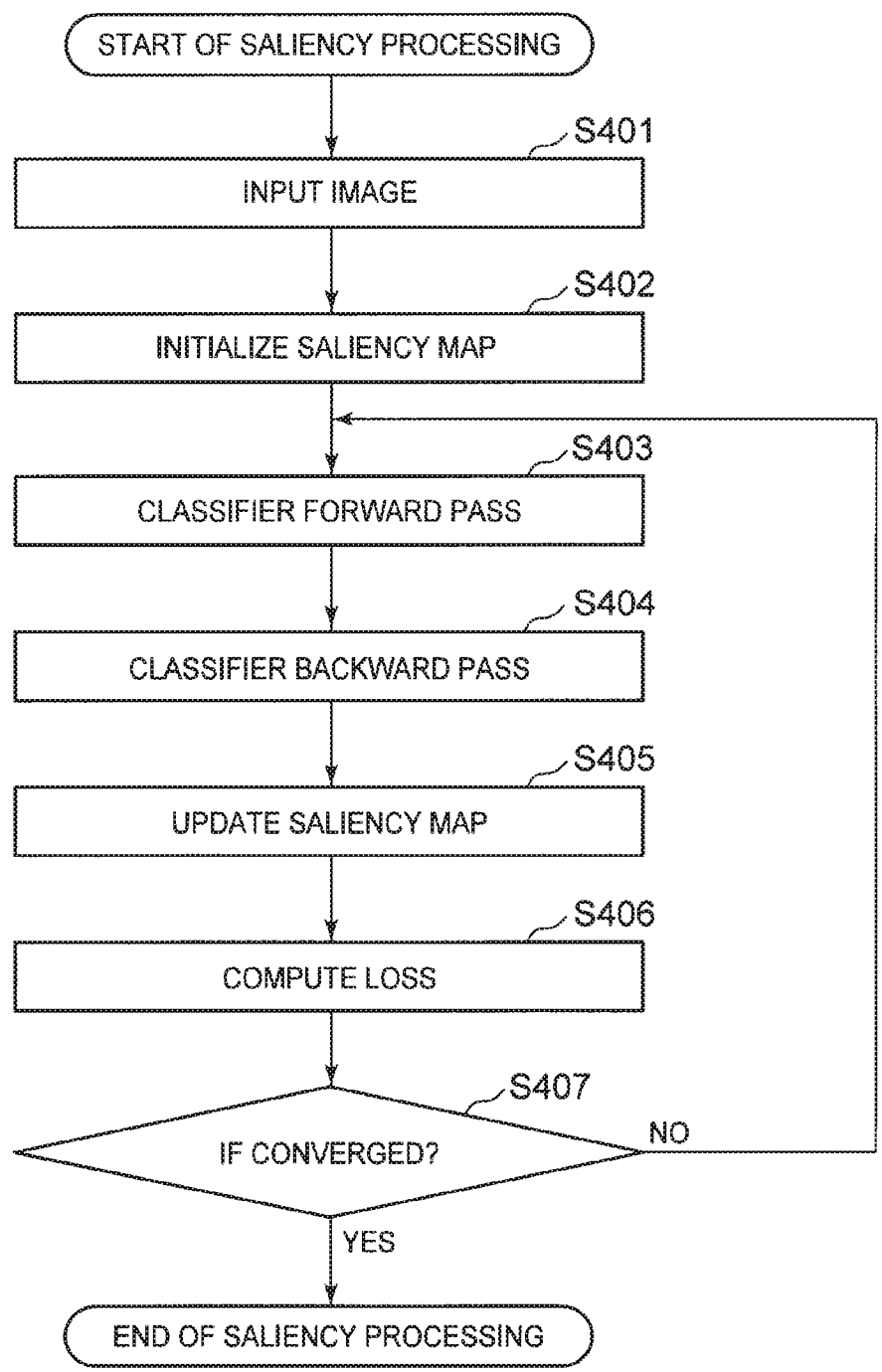
FIG. 5 is a flowchart showing the saliency process of the image processing device 100 according to the first exemplary embodiment of the present invention.

FIG. 5 is a flowchart showing the saliency process of the image processing device 100 according to the first exemplary embodiment of the present invention. With reference to FIG. 5, the scaled samples are used as input; shown in Step S401. In Step S402 a saliency map is initialized by random values using a Gaussian distribution with mean zero and unit variance. This is shown in the Equation (5) below:

[Math. 5]

$$P = \frac{1}{(2\pi)^{d/2}S^{1/2}} e^{\frac{-(p-m)^T S^{-1}(p-m)}{2}} \qquad \text{Equation (5)}$$

Here 'P' is the random value for initialization, 'm' is the mean of Gaussian distribution, 'S' is the standard deviation and 'd' is the dimension of the saliency map. After initialization the classifier forward pass is computed in Step S403. The Equation (6) represents the classifier forward pass i.e. computing the class label when given an input image which is the randomly initialized saliency map.

[Math. 6]

$$\max_I \{L(I) - c\|I\|^2\} \qquad \text{Equation (6)}$$

In the Equation (6) 'L' is classifier function which takes the input the image 'I', also 'c' is a constant that is used for regularization of the maximization.

The next step is the classifier backward pass (Step S404), using this step we get the gradients of the Equation (6) with respect to the input saliency map image. This step provides us with the direction in which we should update the saliency map image so that we can maximize the Equation (6). Step S404 is implemented using the equation below:

[Math. 7]

$$I' = I + a(\nabla L(I) - 2cI)$$ 
Equation (7)

In the Equation (7), '$\nabla L$' is the gradient of the classifier function with respect to the saliency map image and 'a' is a constant which controls the step size. In this equation 'I' is the updated saliency map of Step S405. In the next step we compute the loss that is incurred after taking one forward pass and one backward pass in Step S406. If the loss is sufficiently low (YES in Step S407), the algorithm has converged and saliency processing can be stopped. However if the loss is still not sufficiently low enough (NO in Step S407), then we again perform the steps from Step S403. These steps are repeated until the saliency map image has low loss and the algorithm has converged.

After the estimation processing is completed by the above mentioned steps, the features are re-normalized once again. Now the feature matching step can be performed. The matching can be done using the kernel methods such as intersection kernel, Gaussian kernel, polynomial kernel etc.

[Math. 8]

$$r = \frac{1}{d} \sum_{j=1}^{d} \min(x_j, I_j)$$ 
Equation (8)

The Equation (8) gives the matching score 'r' between the features of the target image 'I' and the feature of the probe image 'x'. Here, 'd' is the dimension length of the features and 'j' is the dimension index. The target image with the lowest score is selected.

One of the objects of the present invention is to provide an image processing device that is capable of object recognition accurately and reducing the effect of the background on the similarity score or the distance score.

The first advantageous effect of the present exemplary embodiment is that it is able to estimate the object accurately and reduce the effect of the background on the recognition score.

Other advantageous effects of the present exemplary embodiment will be explained as follows. The advantage of the present exemplary embodiment is that, multiple metrics can still be used with this method, like PTL 1 which combines many metrics together. This image processing device can be used to reduce the background effect which will improve the performance of each metric.

Another advantageous effect of the present exemplary embodiment is that the model parameter does not require handcrafted features unlike in NPL 1 and PTL 2. Handcrafted features limit the applicability of the technique and decreases generalizability. This image processing device can be utilized with any technique which requires background removal.

An additional advantageous effect of the present exemplary embodiment is that there is no need to compute the projection matrix and hence no need for the camera calibration information unlike PTL 3.

An additional advantageous effect of the present exemplary embodiment is that similar to NPL 2 the learning is end to end and given an input image pair outputs the similarity score directly. However unlike NPL 2 the distance function for this image processing device is not limited to Euclidean distance.

Also, heavy optimization techniques such as latent support vector machines are not needed and hence real time operation is also possible. Moreover, rigid shapes and non-rigid shapes can also be recognized. Furthermore, exemplars for changes in shape, pose and parts are not needed.

The device disclosed in PTL 4 and the method disclosed in PTL 5 are deterministic and not probabilistic. However, the present exemplary embodiment is a probabilistic method and needs a probability map which is provided by the saliency generation unit 106. Also, the present exemplary embodiment does not need any hardware or calibration information, and has no assumption in PTL 5.

Second Exemplary Embodiment

Next, a second exemplary embodiment of the present invention will be described in detail with reference to drawings.

Figure 6:
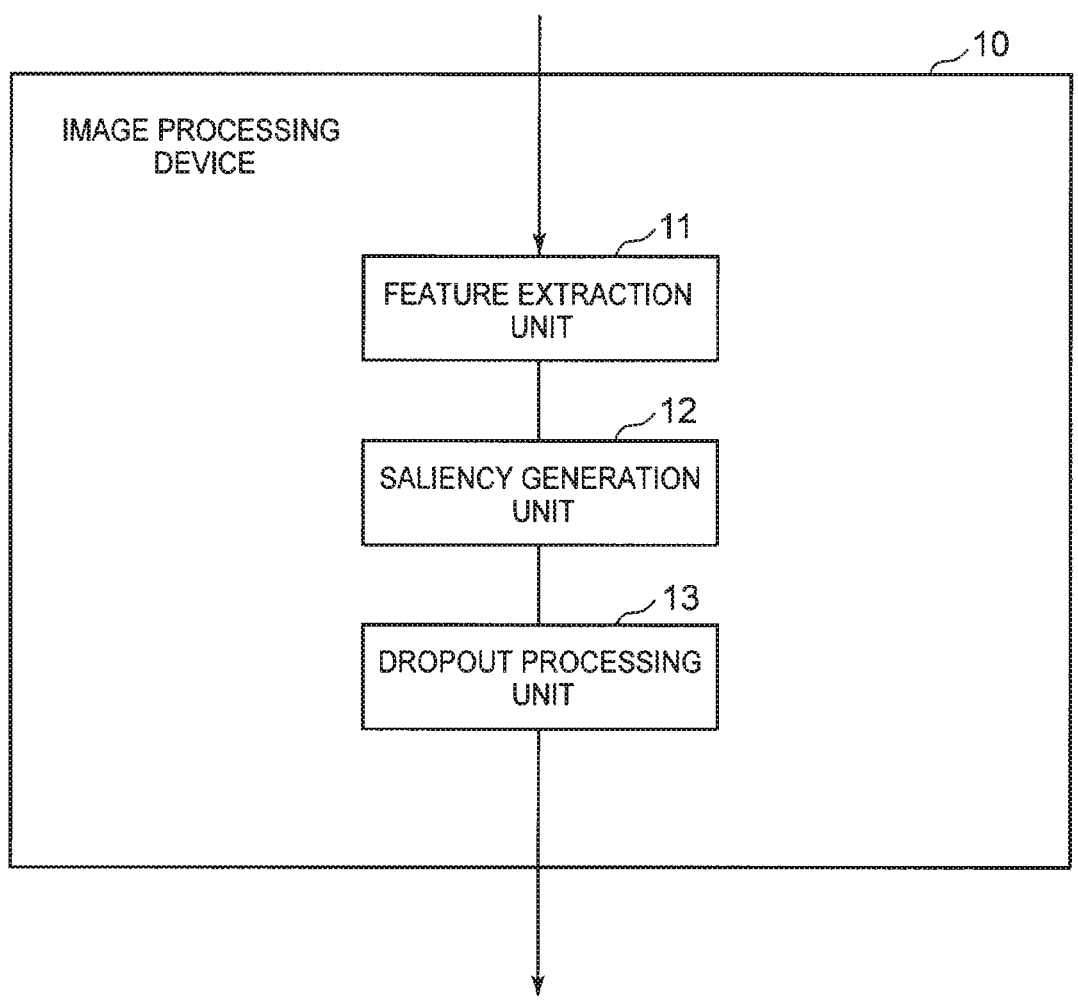
FIG. 6 is a block diagram showing an example of a structure of an image processing device 10 according to a second exemplary embodiment of the present invention.

FIG. 6 is a block diagram showing an example of a structure of an image processing device 10 according to the second exemplary embodiment of the present invention. With reference to FIG. 6, the image processing device 10 includes: a feature extraction unit 11 (the feature extraction unit 103, for example) which obtains features in each of scaled samples of the region of interest in a probe image; a saliency generation unit 12 (the saliency generation unit 106, for example) which computes the probabilities of the pixels in the scaled samples that contribute to the score or the label of the object of interest in the region; a dropout processing unit 13 (the dropout processing unit 107, for example) which removes the features from the scaled samples which are not essential for the computing the score or the label of the object, using the computed probabilities.

With the structure, the image processing device can reduce the effect of the background on the similarity score or the similarity label of the object recognition task.

The second exemplary embodiment has the same advantageous effect as the first advantageous effect of the first exemplary embodiment. The reason that the advantageous effect is the same as that of the first advantageous effect of the first exemplary embodiment is because the fundamental principal is the same in both embodiments.

The image processing device 10 may include a feature matching unit (the feature matching unit 108, for example) which obtains the similarity between a given target image and a scaled sample of the probe image and selects the scaled sample with the maximum similarity as the final output.

With the structure, the image processing device can output the scaled sample with the maximum similarity.

The dropout processing unit 13 may generate the mask for removing the features which are not essential for the computing the score or the label of the object, using the computed probabilities, and removes the features from the scaled samples, using the generated mask.

Here the neurons which belong to the background pixels are computed and a mask is generated which can be threshold for the features belonging to such pixels.

With the structure, the image processing device can remove the features from the scaled samples using the generated mask.

The image processing device 10 may include a learning unit (the learning unit 104, for example) which learns the models parameters by one or more series of training samples which contain target image and probe image pairs and a label indicating whether they are the same object or not.

With the structure, the image processing device can learn a relation between target image and probe image.

The image processing device 10 may include a feature map updating unit (the dropout processing unit 107, for example) which updates feature map by applying the mask generated by the dropout processing unit 13 for removing the features whose pixels result in a saliency map with low probability.

With the structure, the image processing device can update feature map using the mask.

The image processing device 10 may include a feature normalization unit (the dropout processing unit 107, for example) which normalizes the remaining features again after removing the features by the dropout processing unit 13.

With the structure, the image processing device can perform the feature matching step using the kernel methods.

Each of the image processing device 100 and the image processing device 10 can be implemented using a computer and a program controlling the computer, dedicated hardware, or a set of a computer and a program controlling the computer and a dedicated hardware.

Figure 7:
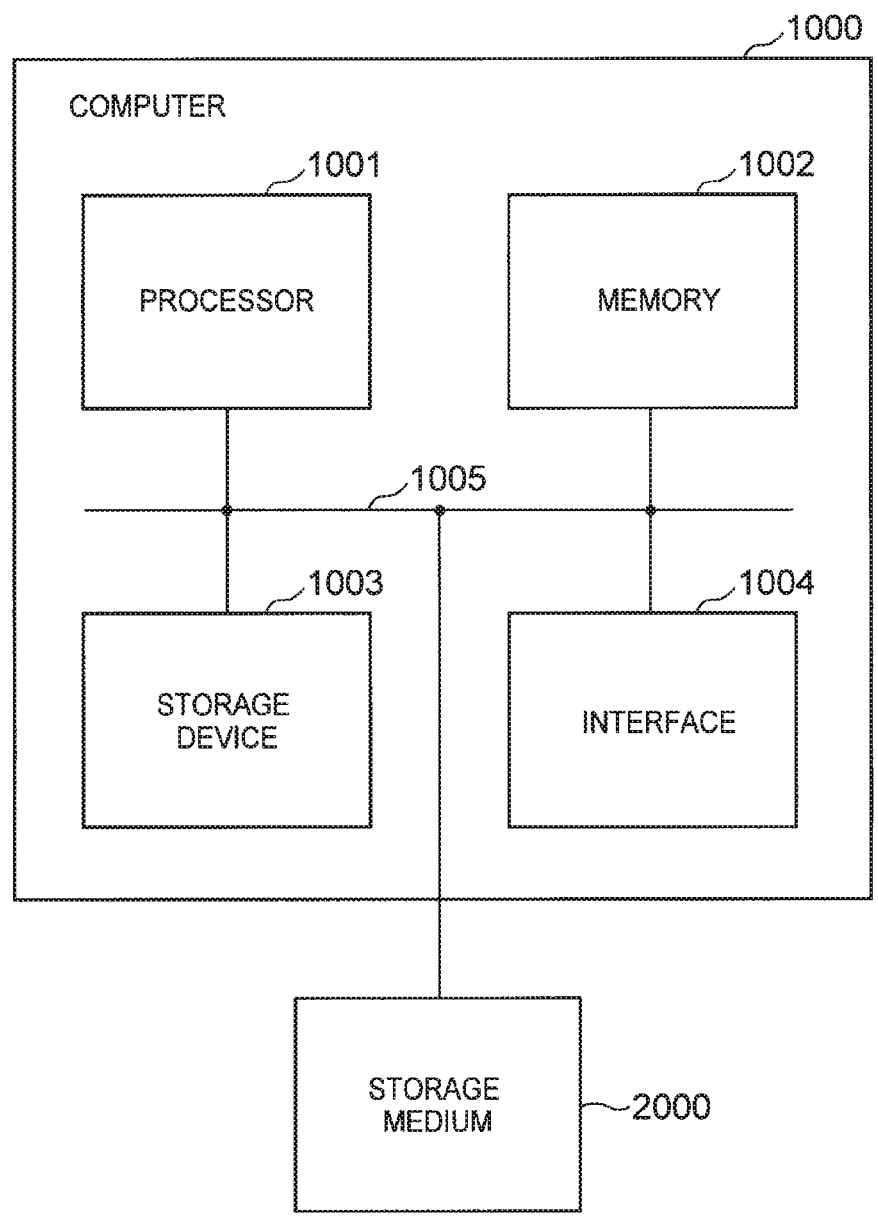
FIG. 7 is a block diagram showing an example of a hardware structure of a computer 1000 which is able to realize the image processing device according to the exemplary embodiments of the present invention.

FIG. 7 is a block diagram showing an example of a hardware structure of a computer 1000 which is able to realize the image processing device 100 and the image processing device 10, which are described above. With reference to FIG. 7, the computer 1000 includes a processor 1001, a memory 1002, a storage device 1003 and an interface 1004, which are communicably connected via a bus 1005. The computer 1000 can access storage medium 2000. Each of the memory 1002 and the storage device 1003 may be a storage device, such as a RAM (Random Access Memory), a hard disk drive or the like. The storage medium 2000 may be a RAM, a storage device such as a hard disk drive or the like, a ROM (Read Only Memory), or a portable storage medium. The storage device 1003 may operate as the storage medium 2000. The processor 1001 can read data and a program from the memory 1002 and the storage device 1003, and can write data and a program in the memory 1002 and the storage device 1003. The processor 1001 can communicate with a server (not illustrated) which provides frames for the processor 1001, a terminal (not illustrated) to output the final output shape, and the like over the interface 1004. The processor 1001 can access the storage medium 2000. The storage medium 2000 stores a program that causes the computer 1000 operates as the image processing device 100 or the image processing device 10.

The processor 1001 loads the program, which causes the computer 1000 operates as the image processing device 100 or the image processing device 10, stored in the storage medium 2000 into the memory 1002. The processor 1001 operates as the image processing device 100 or the image processing device 10 by executing the program loaded in the memory 1002.

The input unit 101, the object detection unit 102, the feature extraction unit 103, the learning unit 104, the saliency generation unit 106, the feature matching unit 108, the dropout processing unit 107 and the output unit 110 can be realized by a dedicated program that is loaded in the memory 1002 from the storage medium 2000 and can realize each of the above-described units, and the processor 1001 which executes the dedicated program. The model storage unit 105, the parameter update unit 109 and the training dataset storage unit 111 can be realized by the memory 1002 and/or the storage device 1003 such as a hard disk device or the like. A part of or all of the input unit 101, the object detection unit 102, the feature extraction unit 103, the learning unit 104, the model storage unit 105, the saliency generation unit 106, the dropout processing unit 107, the feature matching unit 108, the parameter update unit 109, the output unit 110 and the training dataset storage unit 111 can be realized by a dedicated circuit that realizes the functions of the above-described units.

As a final point, it should be clear that the process, techniques and methodology described and illustrated here are not limited or related to any particular apparatus. It can be implemented using a mixture of components. Also various types of general purpose device may be used in accordance with the instructions herein. The present invention has also been described using a particular set of examples. However, these are merely illustrative and not restrictive. For example the described software may be implemented in a wide variety of languages such as C, C++, Java, Python and Perl etc. Moreover other implementations of the inventive technology will be apparent to those skilled in the art.

While the present invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Part or the entirety of the above exemplary embodiments can be described as in the following notes and, however, is by no means limited to the following notes.

(Supplementary note 1) An image processing method comprising the steps of: obtaining features in each of scaled samples of the region of interest in a probe image; computing the probabilities of the pixels in the scaled samples that contribute to the score or the label of the object of interest in the region; removing the features from the scaled samples which are not essential for the computing the score or the label of the object, using the computed probabilities.

(Supplementary note 2) The image processing method according to Supplementary note 1, comprising the steps of: generating the mask for removing the features which are not essential for the computing the label or the score of the object and applying the mask for removing the features whose pixels result in a saliency map with low probability. Here the neurons which belong to the background pixels are computed and a mask is generated which can be threshold for the features belonging to such pixels.

(Supplementary note 3) The image processing method according to Supplementary note 1 or 2, comprising the steps of: learning the models parameters by one or more series of training samples which contain target image and probe image pairs and a label indicating whether they are the same object or not.

(Supplementary note 4) The image processing method according to any one of Supplementary note 1 to 3, comprising the steps of: obtaining scaled samples of the image from the given region of interest.

(Supplementary note 5) The image processing method according to any one of Supplementary note 1 to 4, comprising the steps of: normalizing the remaining features again after removing the features.

(Supplementary note 6) A non-transitory computer-readable recording medium having recorded therein an image processing program that, when executed by a computer, obtains features in each of scaled samples of the region of interest in a probe image, computes the probabilities of the pixels in the scaled samples that contribute to the score or the label of the object of interest in the region, and removes the features from the scaled samples which are not essential for the computing the score or the label of the object, using the computed probabilities.

(Supplementary note 7) A non-transitory computer-readable recording medium according to Supplementary note 6, the image processing program when executed by the computer, generates the mask for removing the features which are not essential for the computing the label or the score of the object, and applies the mask for removing the features whose pixels result in a saliency map with low probability. Here the neurons which belong to the background pixels are computed and a mask is generated which can be threshold for the features belonging to such pixels.

(Supplementary note 8) A non-transitory computer-readable recording medium according to Supplementary note 6 or 7, the image processing program when executed by the computer, learns the models parameters by one or more series of training samples which contain target image and probe image pairs and a label indicating whether they are the same object or not.

(Supplementary note 9) A non-transitory computer-readable recording medium according to any one of Supplementary note 6 to 8, the image processing program when executed by the computer, obtains scaled samples of the image from the given region of interest.

(Supplementary note 10) A non-transitory computer-readable recording medium according to any one of Supplementary note 6 to 9, the image processing program when executed by the computer, normalizes the remaining features again after removing the features.

REFERENCE SIGNS LIST 10, 100 image processing device
11, 103 feature extraction unit
12, 106 saliency generation unit
13, 107 dropout processing unit
101 input unit
102 object detection unit
104 learning unit
105 model storage unit
108 feature matching unit
109 parameter update unit
110 output unit
111 training dataset storage unit
1000 computer
1001 processor
1002 memory
1003 storage device
1004 interface
1005 bus
2000 storage medium

What is claimed is:

1. An image processing device comprising:
a memory storing a software component; and
at least one processor configured to execute the software component to perform:
obtaining features in each of scaled samples of a region of interest in a probe image;
computing probabilities of pixels in the scaled samples that contribute to a score or a label of an object of interest in the region;
removing features from the scaled samples which are not essential for computing the score or the label of the object, using the computed probabilities; and
selecting the scaled sample using remaining features after removing the features.

2. The image processing device according to claim 1, wherein the at least one processor further configured to execute the software component to perform:
obtaining a similarity between a given target image and a scaled sample of the probe image and selecting the scaled sample with a maximum similarity as a final output.

3. The image processing device according to claim 2, wherein the at least one processor further configured to execute the software component to perform:
learning a models parameters by one or more series of training samples which contain target image and probe image pairs and a label indicating whether they are the same object or not.

4. The image processing device according to claim 3, wherein the at least one processor further configured to execute the software component to perform:
normalizing the remaining features again after removing the features.

5. The image processing device according to claim 2, wherein the at least one processor further configured to execute the software component to perform:
generating a mask for removing the features which are not essential for the computing the score or the label of the object, using the computed probabilities, and removes the features from the scaled samples, using the generated mask.

6. The image processing device according to claim 5, wherein the at least one processor further configured to execute the software component to perform:
updating feature map by applying the mask generated for removing the features whose pixels result in a saliency map with low probability.

7. The image processing device according to claim 6, wherein the at least one processor further configured to execute the software component to perform:
normalizing the remaining features again after removing the features.

8. The image processing device according to claim 5, wherein the at least one processor further configured to execute the software component to perform:
normalizing the remaining features again after removing the features.

9. The image processing device according to claim 2, wherein the at least one processor further configured to execute the software component to perform:
normalizing the remaining features again after removing the features.

10. The image processing device according to claim 1, wherein the at least one processor further configured to execute the software component to perform:
generating a mask for removing the features which are not essential for the computing the score or the label of the object, using the computed probabilities, and removing the features from the scaled samples, using the generated mask.

11. The image processing device according to claim 10, wherein the at least one processor further configured to execute the software component to perform:

updating feature map by applying the mask generated for removing the features whose pixels result in a saliency map with low probability.

12. The image processing device according to claim 11, wherein the at least one processor further configured to execute the software component to perform:

normalizing the remaining features again after removing the features.

13. The image processing device according to claim 10, wherein the at least one processor further configured to execute the software component to perform:

normalizing the remaining features again after removing the features.

14. The image processing device according to claim 1, wherein the at least one processor further configured to execute the software component to perform:

normalizing the remaining features again after removing the features.

15. An image processing method comprising:

obtaining features in each of scaled samples of a region of interest in a probe image;

computing probabilities of pixels in the scaled samples that contribute to a score or a label of an object of interest in the region;

removing features from the scaled samples which are not essential for computing the score or the label of the object, using the computed probabilities; and selecting the scaled sample using remaining features after removing the features.

16. The image processing method according to claim 15, further comprising:

obtaining a similarity between a given target image and a scaled sample of the probe image; and selecting the scaled sample with a maximum similarity as a final output.

17. A non-transitory computer-readable recording medium having recorded therein an image processing program that, when executed by a computer, obtains features in each of scaled samples of a region of interest in a probe image, computes probabilities of pixels in the scaled samples that contribute to a score or a label of an object of interest in the region, removes features from the scaled samples which are not essential for the computing the score or the label of the object, using the computed probabilities, and selects the scaled sample using remaining features after removing the features.

18. A non-transitory computer-readable recording medium according to claim 17, the image processing program when executed by the computer, obtains a similarity between a given target image and a scaled sample of the probe image, and selects the scaled sample with a maximum similarity as a final output.

* * * * *